(12) United States Patent
Ekin

(10) Patent No.: US 11,263,899 B2
(45) Date of Patent: Mar. 1, 2022

(54) RETROFITTABLE MODULAR SCHOOL BUS SAFETY APPARATUS

(71) Applicant: EKIN TEKNOLOJI SANAYI VE TICARET ANONIM SIRKETI, Istanbul (TR)

(72) Inventor: Akif Ekin, Istanbul (TR)

(73) Assignee: EKIN TEKNOLOJI SANAYI VE TICARET ANONIM SIRKETI, Istanbul (TR)

(*) Notice: Subject to any disclaimer, the term of this patent is extended or adjusted under 35 U.S.C. 154(b) by 0 days.

(21) Appl. No.: 16/851,122

(22) Filed: Apr. 17, 2020

(65) Prior Publication Data

US 2021/0327266 A1 Oct. 21, 2021

(51) Int. Cl.
| | |
|---|---|
| *G08G 1/054* | (2006.01) |
| *G06K 9/00* | (2006.01) |
| *B60Q 5/00* | (2006.01) |
| *G08G 1/04* | (2006.01) |
| *G06K 9/32* | (2006.01) |

(52) U.S. Cl.
CPC ............ *G08G 1/054* (2013.01); *B60Q 5/006* (2013.01); *G06K 9/00228* (2013.01); *G08G 1/04* (2013.01); *G06K 9/325* (2013.01); *G06K 2209/15* (2013.01)

(58) Field of Classification Search
CPC .......... G08G 1/054; G08G 1/04; B60Q 5/006; G06K 9/00228; G06K 9/325; G06K 2209/15
USPC ............ 340/901, 903, 904, 937, 944, 425.5, 340/426.22, 433, 539.1, 539.11, 539.13, 340/539.22, 539.23, 539.25
See application file for complete search history.

(56) References Cited

U.S. PATENT DOCUMENTS

| | | | |
|---|---|---|---|
| 5,027,200 A | 6/1991 | Petrossian et al. | |
| 5,382,953 A | 1/1995 | Hauptli | |
| 5,510,764 A | 4/1996 | Hauptli | |
| 5,563,579 A * | 10/1996 | Carter | B60R 25/102 235/382 |

(Continued)

FOREIGN PATENT DOCUMENTS

| | | |
|---|---|---|
| CA | 2864653 A1 | 3/2015 |
| CA | 2985266 A1 | 5/2018 |

(Continued)

*Primary Examiner* — Daryl C Pope
(74) *Attorney, Agent, or Firm* — Bayramoglu Law Offices LLC

(57) ABSTRACT

A retrofittable modular school bus safety apparatus comprising a CPU, a plurality of sensors and scanners, an electrical plug device, and an output device. The electrical plug device is preferably adapted to plug into an auxiliary power port, a USB port or an OBD port to provide electrical power to the apparatus and to provide actuatable communication to school bus devices such as lights, horns, crossing arm, etc. The sensors include machine vision sensors, proximity detection sensors, and speed detection sensors. The apparatus is adapted to "read" a vehicle's license plate via ALPR, perform facial recognition, automatically monitor and warn/alert traffic proximate the school bus, to automatically respond with an appropriate level of response depending on an observed level of a moving violation, and to automatically wirelessly obtain the traffic laws/regulations applicable to location of the school bus and to operate accordingly.

6 Claims, 11 Drawing Sheets

(56) References Cited

U.S. PATENT DOCUMENTS

| | | | |
|---|---|---|---|
| 5,793,420 A * | 8/1998 | Schmidt | B60R 1/00 340/433 |
| 7,812,711 B2 * | 10/2010 | Brown | G08G 1/0175 340/426.18 |
| 8,599,260 B1 | 12/2013 | Vaughn | |
| 9,305,460 B1 * | 4/2016 | Aza | G08G 1/09623 |
| 9,791,766 B2 | 10/2017 | Ekin | |
| 9,928,737 B2 | 3/2018 | Ekin | |
| 9,946,734 B2 | 4/2018 | Ekin | |
| 2002/0036572 A1 * | 3/2002 | Yamaki | G08G 1/052 340/933 |
| 2007/0252538 A1 * | 11/2007 | Swanger | B60Q 1/2692 318/3 |
| 2008/0319602 A1 * | 12/2008 | McClellan | G07C 5/008 701/31.4 |
| 2009/0072118 A1 * | 3/2009 | Zheng | B60R 11/0258 248/683 |
| 2009/0195651 A1 * | 8/2009 | Leonard | B60R 1/00 348/148 |
| 2011/0163868 A1 | 7/2011 | Gustavsson | |
| 2012/0177336 A1 * | 7/2012 | Bhan | H04N 5/85 386/224 |
| 2012/0307064 A1 * | 12/2012 | Schenken | G08G 1/01 348/149 |
| 2013/0278405 A1 * | 10/2013 | Bacal | H04K 3/415 340/439 |
| 2013/0279742 A1 * | 10/2013 | Howard | G06K 9/00791 382/103 |
| 2014/0046701 A1 * | 2/2014 | Steinberg | G07C 5/008 705/4 |
| 2014/0058632 A1 * | 2/2014 | Jungman | B60K 28/063 701/48 |
| 2018/0001833 A1 * | 1/2018 | Jung | B60R 11/02 |
| 2019/0168635 A1 * | 6/2019 | McLaughlin | B60N 2/28 |
| 2020/0027333 A1 * | 1/2020 | Xu | H04L 67/125 |
| 2020/0045838 A1 * | 2/2020 | Moeller | H05K 5/0073 |
| 2020/0215988 A1 * | 7/2020 | Jackson | G01S 7/4813 |

FOREIGN PATENT DOCUMENTS

| | | |
|---|---|---|
| CN | 107139833 A | 9/2017 |
| CN | 109255857 A | 1/2019 |

* cited by examiner

RETROFITTABLE MODULAR SCHOOL BUS SAFETY APPARATUS

FIELD OF THE INVENTION

The present invention relates to safety apparatuses, and more especially to retrofittable modular safety apparatuses that are adapted to be quickly and easily functionally mounted to a school bus to increase school bus safety by monitoring and assessing vehicular traffic proximate to the school bus.

BACKGROUND

In order to provide increased safety for school children and school bus operators and to reduce the likelihood of contact (e.g. collision) of school children and school bus operators with proximate traffic contact (e.g. collision), especially proximate traffic comprising vehicles driven by otherwise unobservant drivers, some school buses are provided with "built-in" safety systems (e.g. OEM or original equipment safety systems) that provide for various warnings and/or alerts to traffic proximate a school bus. However due to such systems being built-in (incurring hardwiring and mounting costs), the cost of such built-in systems can be relatively high. Moreover, due to various states/localities having disparate traffic laws/regulations, such built-in systems are not commonly well adapted to local traffic laws/regulations, nor are such built-in systems commonly retrofittably adaptable to such local traffic laws/regulations.

SUMMARY

In order to solve the problem of the high cost of retrofitting a bus with safety systems as disclosed above, the present invention is a modular school bus safety system or apparatus adapted to retrofit to a school bus that does not have such safety apparatus, and thus avoids the expense otherwise occurred into "hardwiring" a safety system into a conventional school bus. The apparatus is preferably weatherproof, compact so as to occupy a minimal footprint and space, includes and AE engine (see: https://www.agicent.com/blog/best-ai-engines/), and is "plug and play" (see: https://en.wikipedia.org/wiki/Plug_and_play). In an exemplary embodiment, the apparatus comprises a compact weatherproof safety apparatus modularly retrofit to a school bus, the apparatus further comprising a CPU (Central processing Unit—preferably having a GPS or Global Positioning System, digital storage, LTE (4 G or 5G) (see: https://en.wikipedia.org/wiki/LTE_(telecommunication)), Wi-Fi, and Bluetooth and "all needed accessories"), a plurality of sensors and scanners, an electrical plug device, and an output device (e.g. a video screen and speakers). The electrical plug device is adapted to plug into the auxiliary power outlet (see: https://en.wikipedia.org/wiki/Automobile_auxiliary_power_outlet) of a bus so as to provide electrical power to the apparatus and to provide actuatable communication to school bus devices such as lights, horns, crossing arm, etc. Alternatively the electrical plug device may be adapted to plug into a USB port (i.e. Universal Serial Bus, see: https://en.wikipedia.org/wiki/USB) or an OBD port (i.e. On-Board Diagnostics, see: https://en.wikipedia.org/wiki/On-board diagnostics). In an alternate embodiment, that apparatus does not include an electrical plug device but does include at least one battery and is adapted to connect wirelessly to other school bus devices if/as needed such as via a Bluetooth connection (see: https://en.wikipedia.org/wiki/Bluetooth).

The sensors/scanners preferably include vision sensors (e.g. see: https://en.wikipedia.org/wiki/Machine_vision), proximity detection sensors (e.g. see: https://en.wikipedia.org/wiki/Proximity_sensor), and speed detection sensors (e.g. doppler radar, see: https://en.wikipedia.org/wiki/Doppler_radar). The apparatus is adapted so as to "read" a vehicle's license plate via ALPR or Automatic License Plate Recognition (see: https://www.pcmag.com/encyclopedia/term/alpr) which is also referred to as ANPR or Automatic Number-Plate Recognition (see: https://en.wikipedia.org/wiki/Automatic_number-plate_recognition), and to perform optional facial recognition or facial detection (see: https://en.wikipedia.org/wiki/Facial_recognition_system) and to selectively blur faces such as for privacy reasons (depending on local laws and regulations) for use in an automatic fine process. The apparatus is preferably adapted so as to automatically monitor vehicles proximate the school bus in which the apparatus is installed, especially proximate moving vehicles, that may be speeding in near proximity to the school bus or failing to stop for an actuated stop sign of the bus—especially while the school bus is stopped and passengers are entering and/or exiting the school bus, and upon detecting a proximate speeding vehicle, to automatically respond with an appropriate level of response depending on a level of moving violation (e.g. if a proximate vehicle is speeding but only in the amount of 5 mph or less over the prevailing speed limit, the apparatus may respond with a mild audio or visual warning, but if a proximate vehicle is speeding in excess of 5 mph over the prevailing speed limit or does not stop in response to an actuated stop sign of the bus (see: https://www.youtube.com/watch?v=ueI15dcVhOA&feature=youtu.be&t=36), the apparatus may respond with an aggressive audio or visual warning and/or with an automatic recording of the incident and the forwarding of such information (optionally with the fac of the speeder blurred) to police so that police are enables to send a moving violation ticket (a traffic ticket/fine) to the owner and/or operator of the speeding vehicle). The apparatus is further adapted to automatically actuate warnings, including the actuation of a traffic safety arm and/or stop sign in response to predetermined conditions such as the detection of the school bus stopping to load/unload and the detection of the school bus stopping in proximity to a railroad crossing. The apparatus is further adapted to automatically wirelessly (via the internet) obtain the traffic laws/regulations applicable to location of the school bus and to operate accordingly. The apparatus is further preferably adapted so as to be retrofitted to a school bus in less than two minutes and to operation in less than three minutes from the beginning of the retrofit installation. The apparatus is further preferably adapted so as to fit within an 18-inch×18-inch×12-inch cubic spatial envelope and more preferably is adapted so as to fit within an 8-inch×8-inch×4-inch cubic spatial envelope.

BRIEF DESCRIPTION OF DRAWINGS

In order that the advantages of the invention will be readily understood, a more particular description of the invention briefly described above will be rendered by reference to specific embodiments that are illustrated in the appended drawing. Understanding that the drawing depicts only a typical embodiment of the invention and is not therefore to be considered to be limiting of its scope, the invention will be described and explained with additional specificity and detail through the use of the accompanying drawings, in which.

DETAILED DESCRIPTION OF EMBODIMENTS

Figure 1:
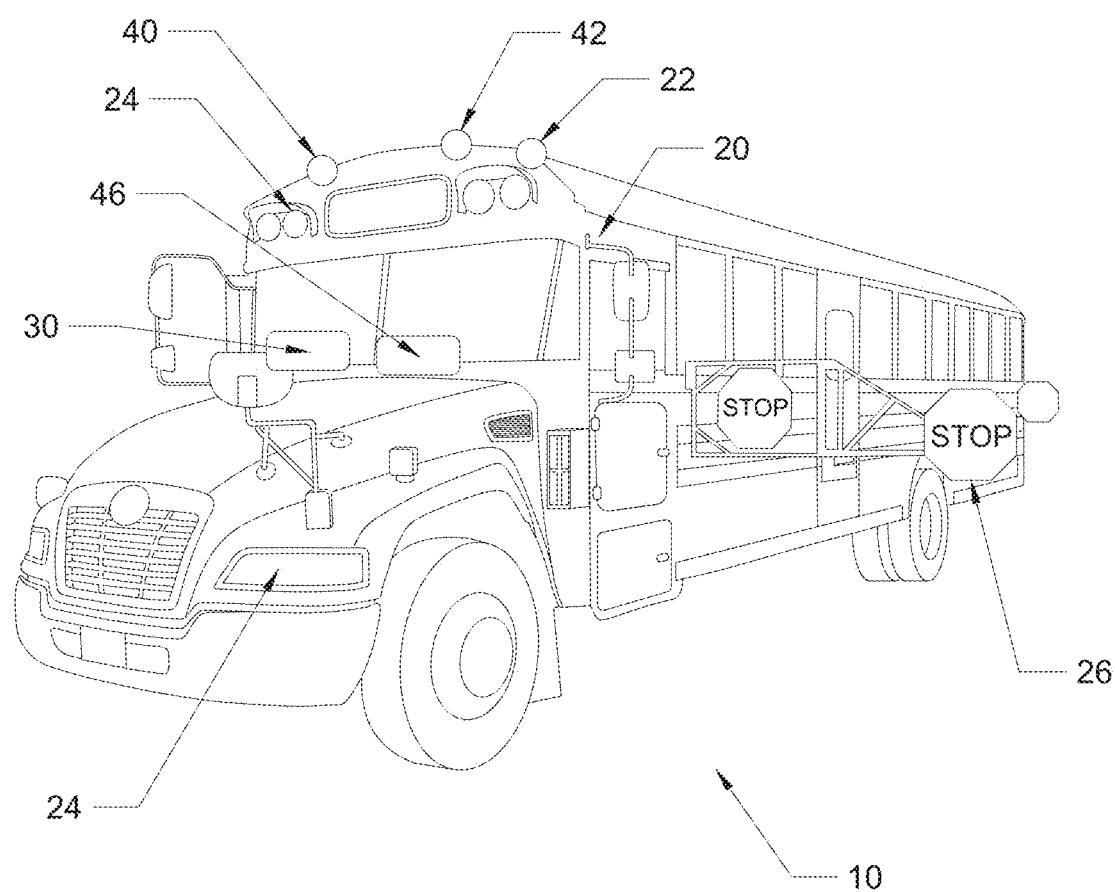
FIG. 1 shows a general schematic view of an embodiment of the present invention.
Figure 2:
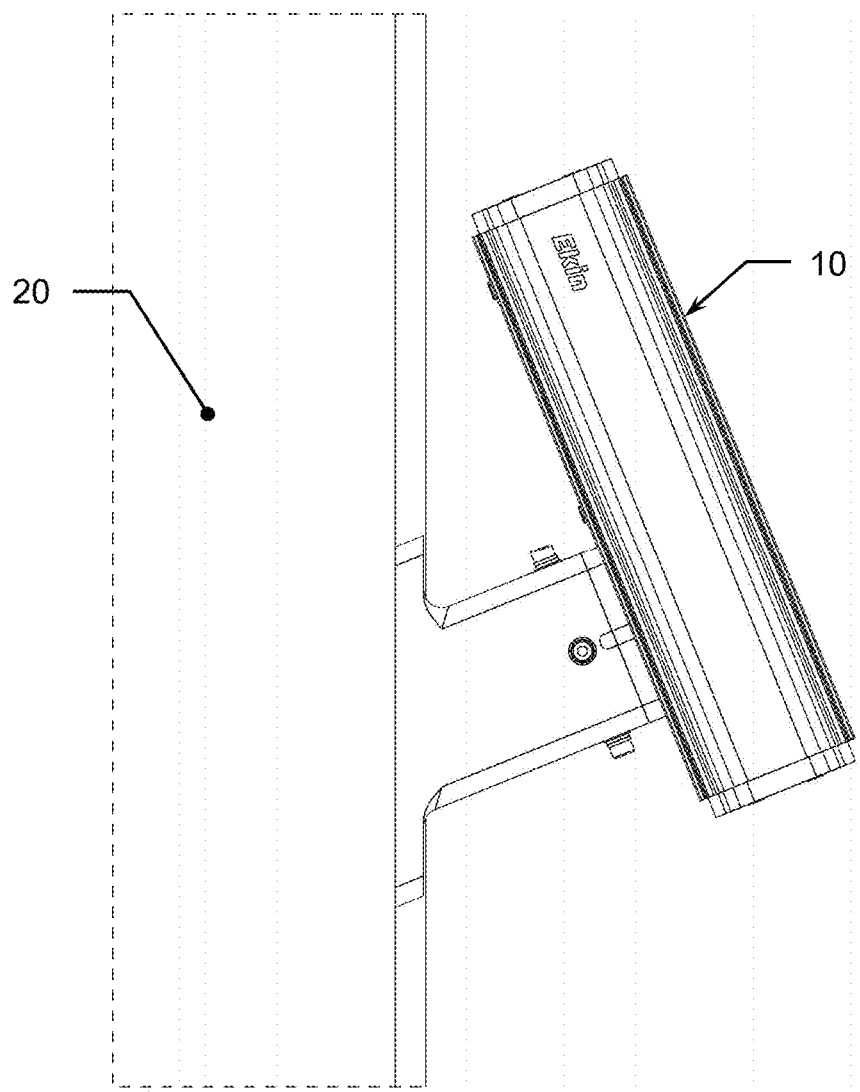
FIG. 2 shows a plan view of an embodiment of the present invention with the retrofittable modular school bus safety apparatus plugged into a school bus.
Figure 3:
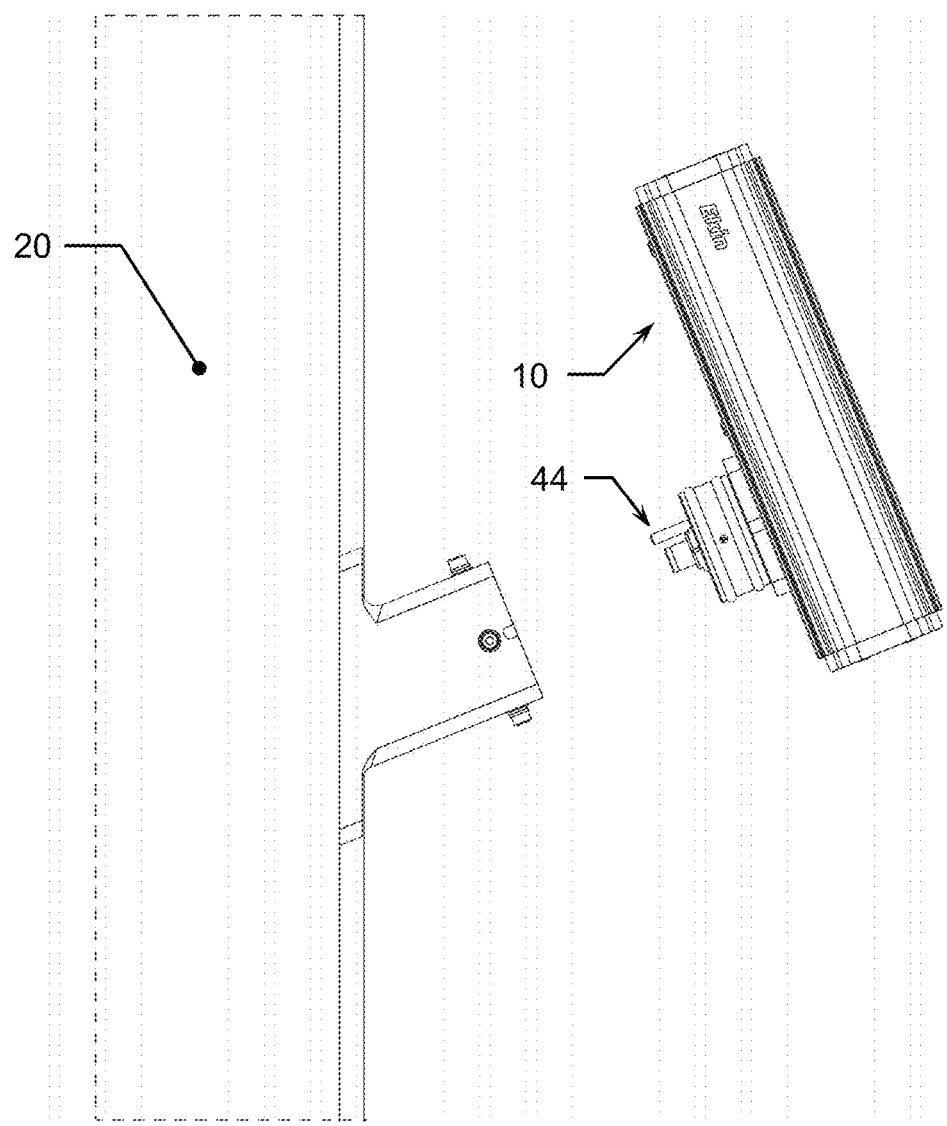
FIG. 3 shows a plan view of an embodiment of the present invention with the retrofittable modular school bus safety apparatus unplugged from a school bus.
Figure 4:
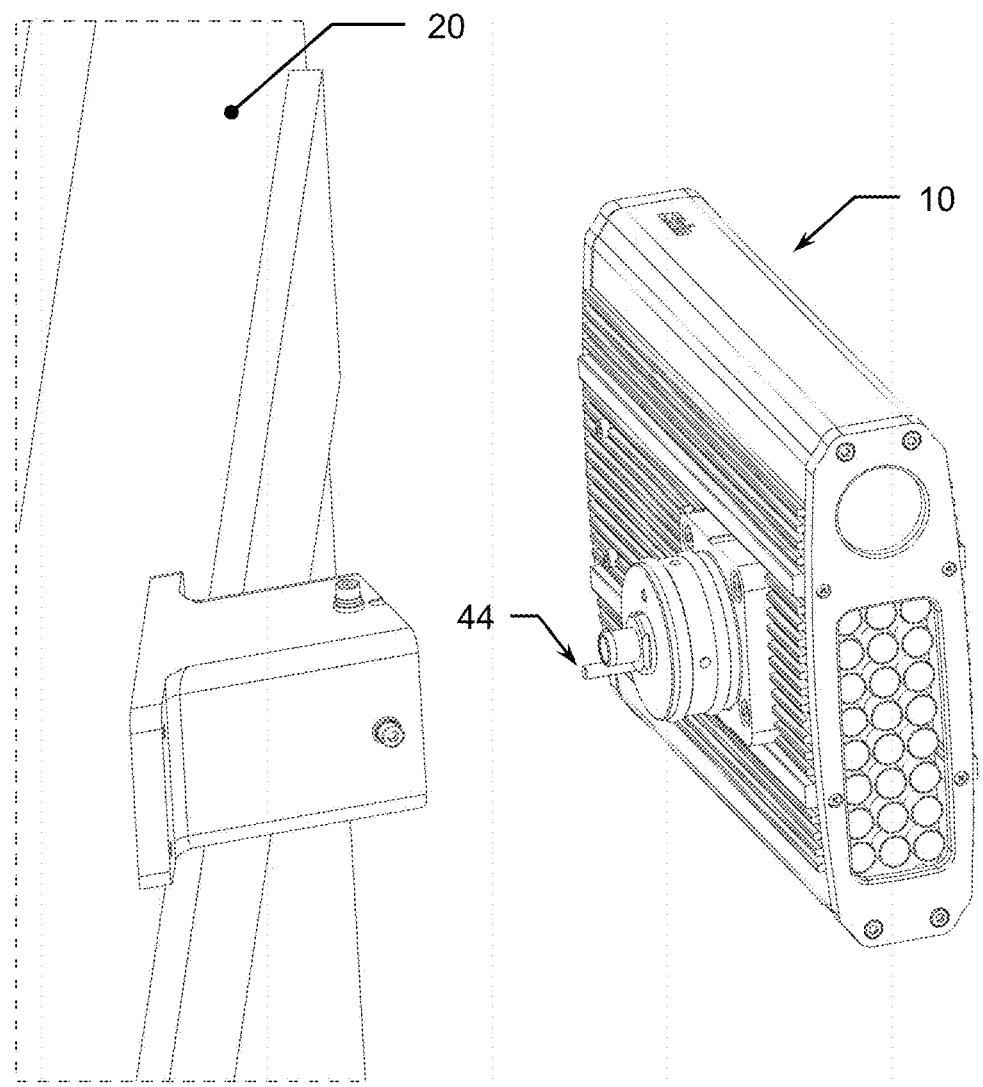
FIG. 4 shows a first trimetric view of an embodiment of the present invention with the retrofittable modular school bus safety apparatus unplugged from a school bus.
Figure 5:
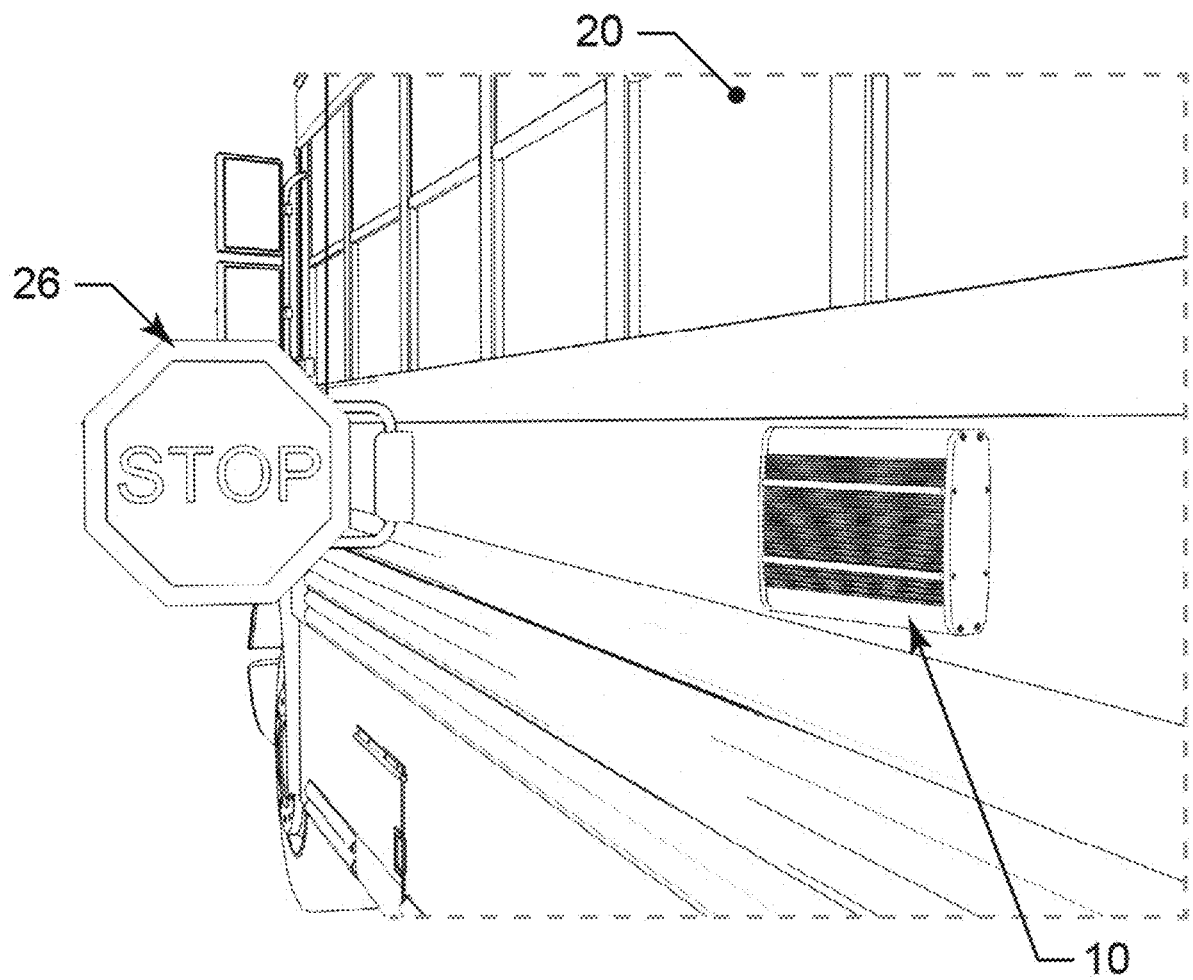
FIG. 5 shows a front second trimetric view of an embodiment of the present invention with the retrofittable modular school bus safety apparatus unplugged from a school bus.
Figure 6:
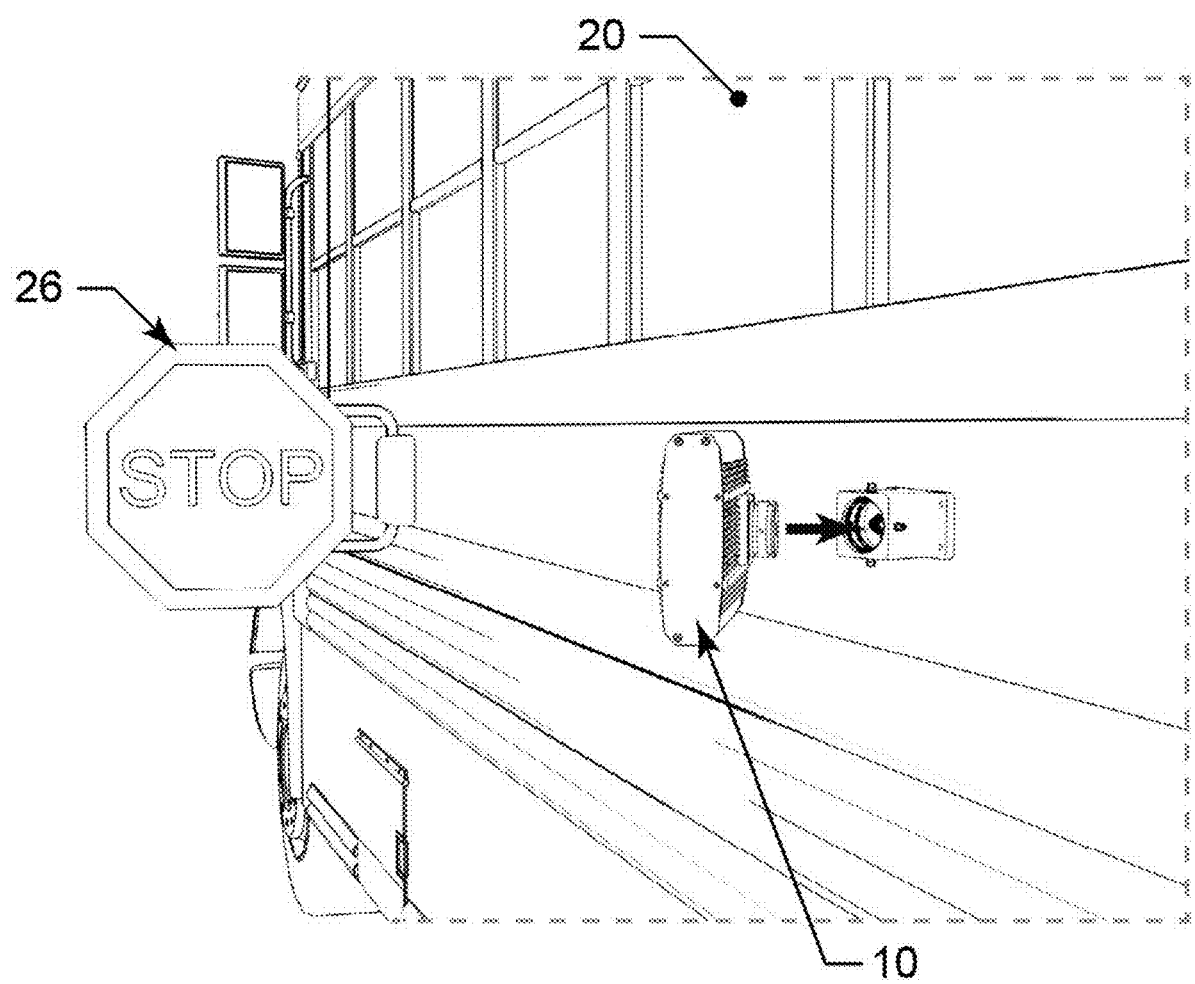
FIG. 6 shows a front second trimetric view of an embodiment of the present invention with the retrofittable modular school bus safety apparatus plugged into a school bus.
Figure 7:
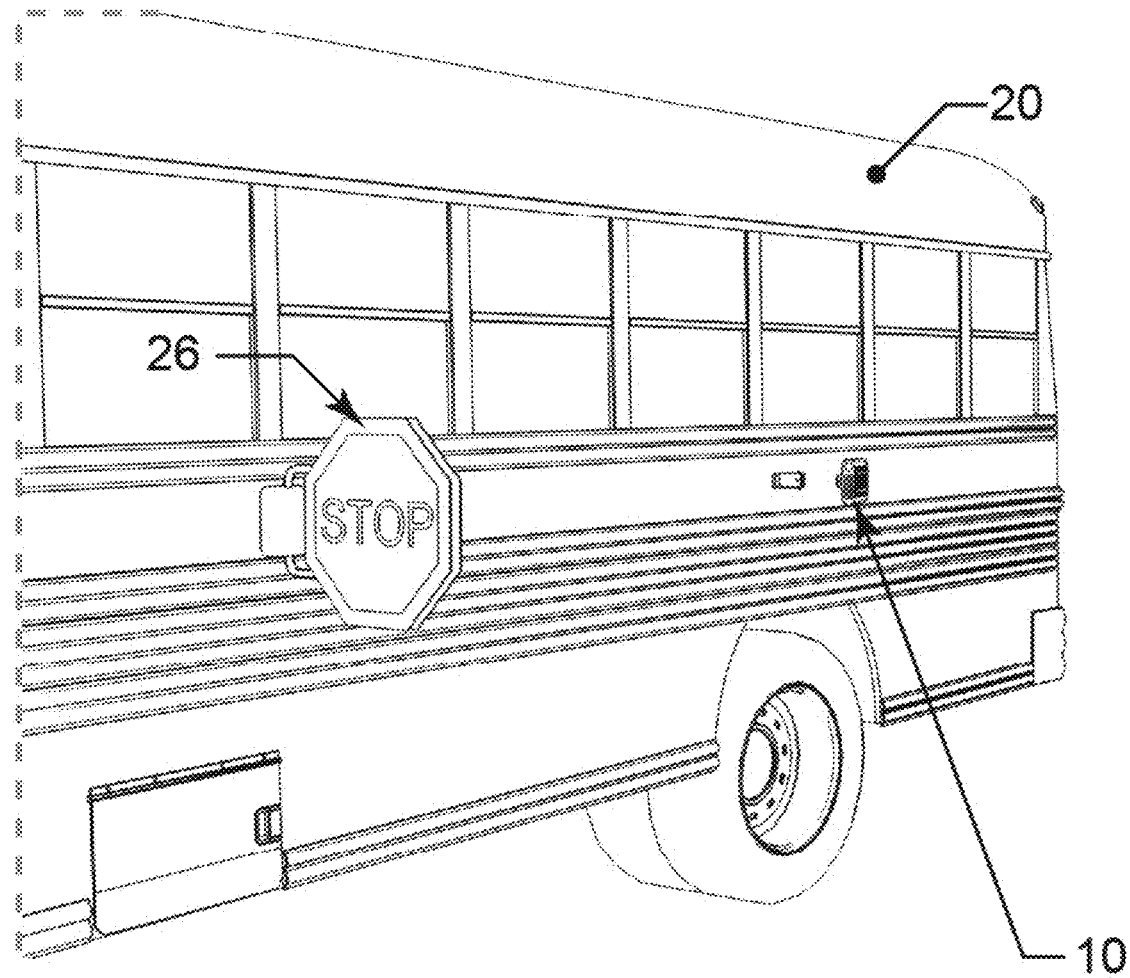
FIG. 7 shows a rear third trimetric view of an embodiment of the present invention with the retrofittable modular school bus safety apparatus unplugged from a school bus.
Figure 8:
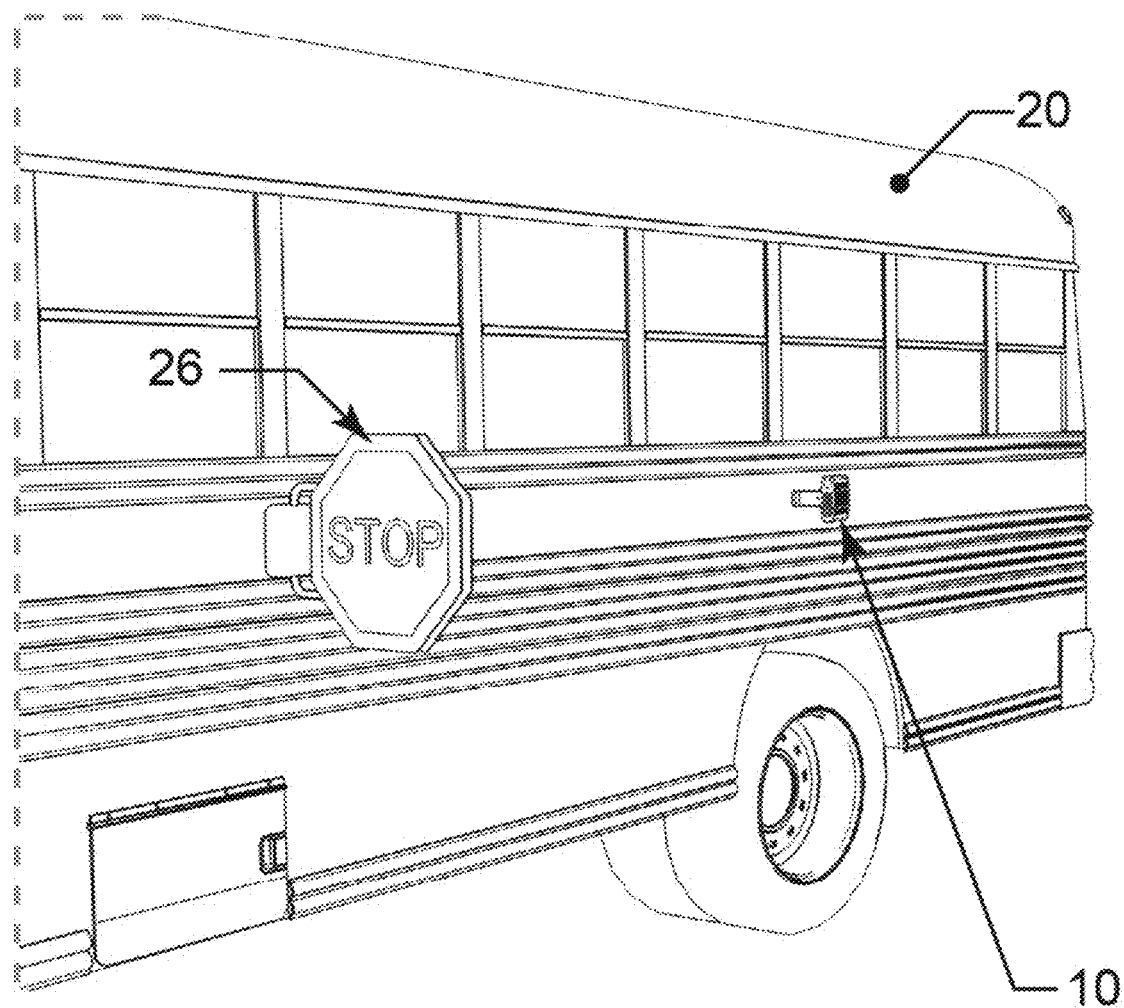
FIG. 8 shows a rear third trimetric view of an embodiment of the present invention with the retrofittable modular school bus safety apparatus plugged into a school bus.
Figure 9:
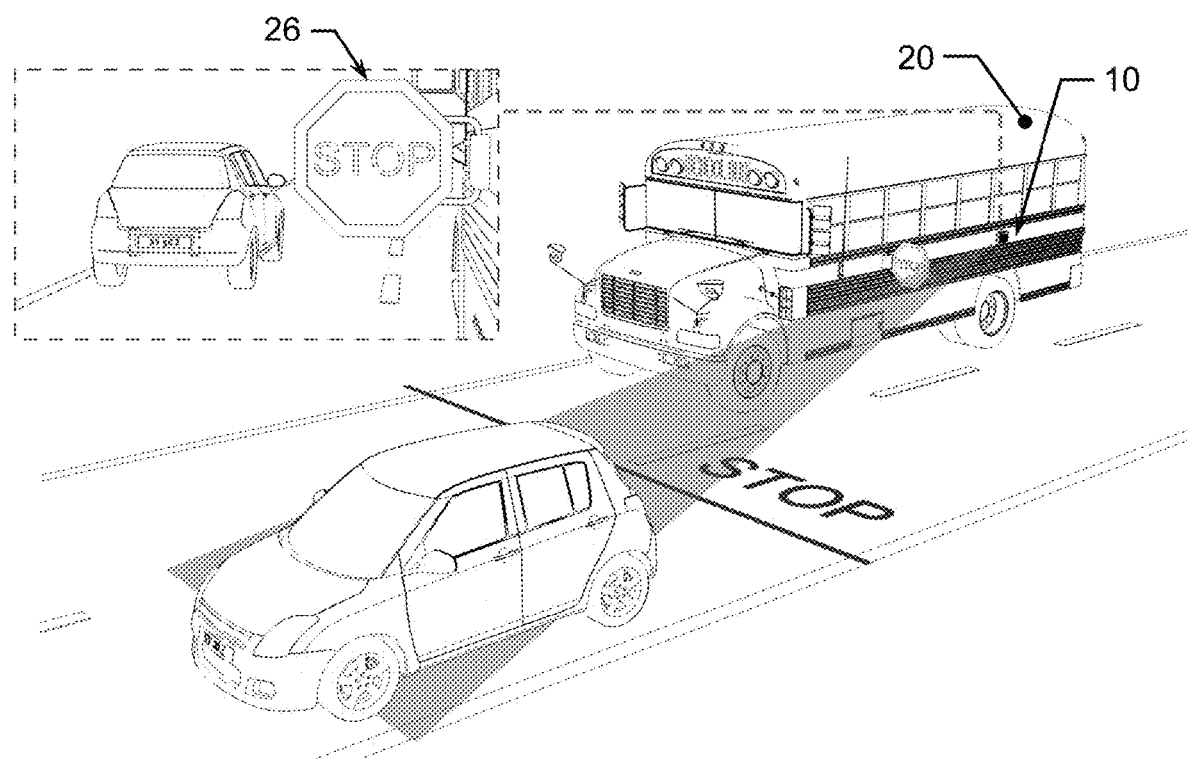
FIG. 9 shows a front trimetric view of an embodiment of the present invention with a vehicle speeding past the bus and the retrofittable modular school bus safety apparatus performing automatic license plate recognition and includes an enlarged view of the rear of the speeding car from the viewing perspective of the apparatus.
Figure 10:
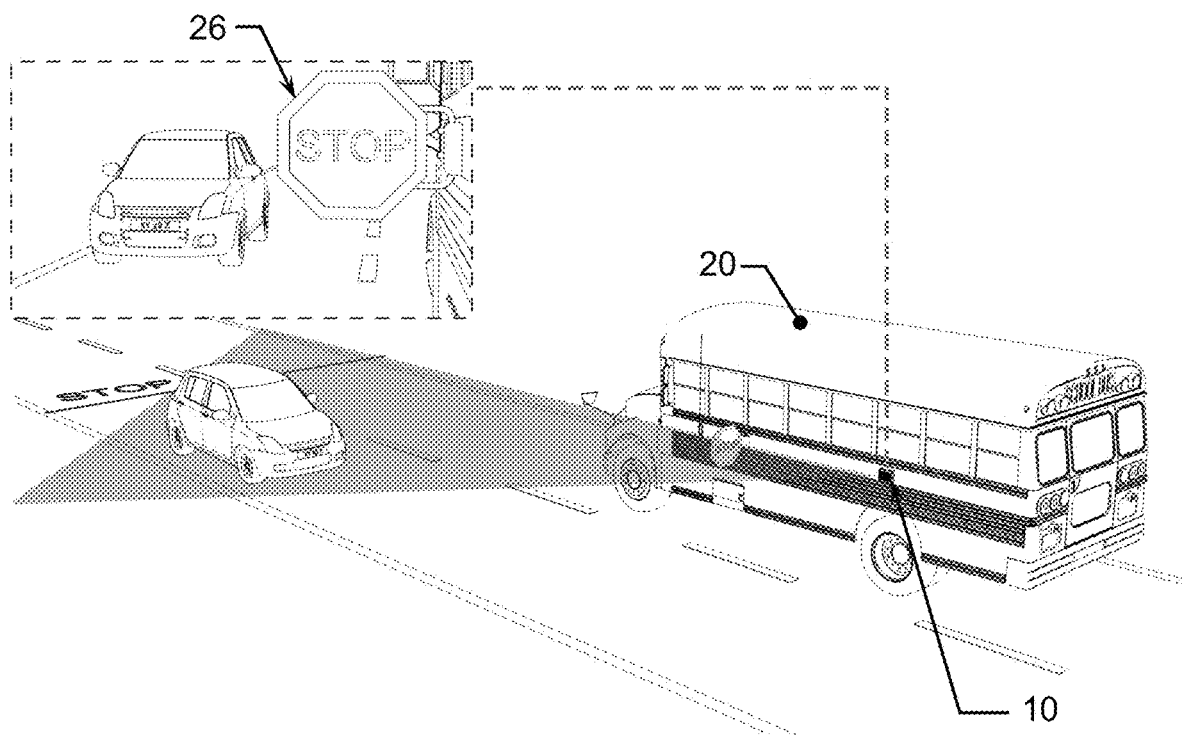
FIG. 10 shows a rear trimetric view of an embodiment of the present invention with a vehicle speeding past the bus and the retrofittable modular school bus safety apparatus performing automatic license plate recognition and includes an enlarged view of the front of the speeding car from the viewing perspective of the apparatus.
Figure 11:
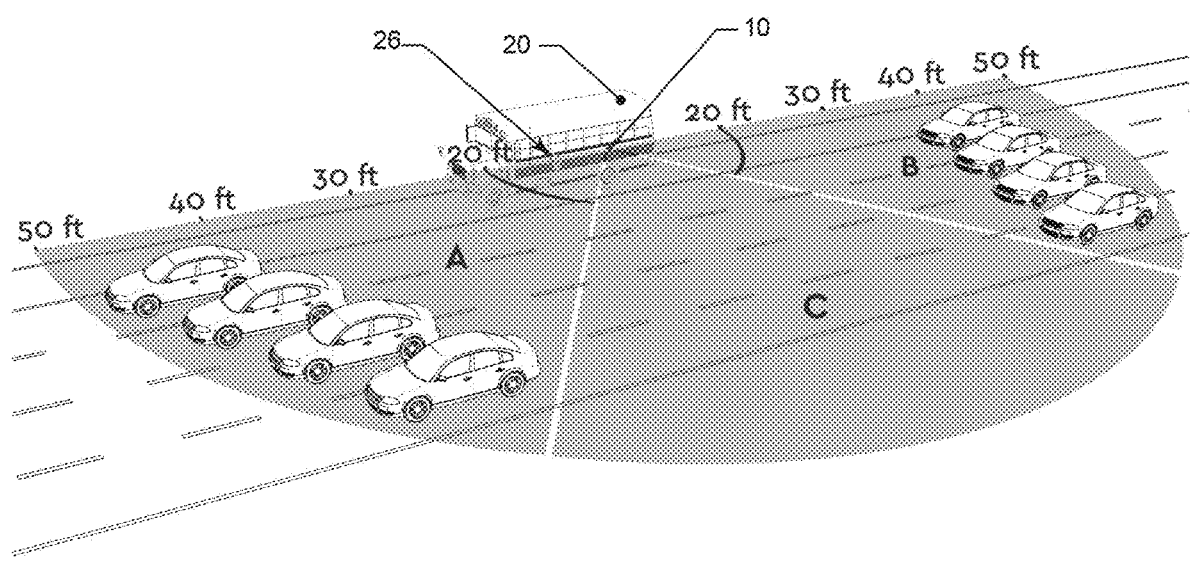
FIG. 11 shows a trimetric view of an embodiment of the present invention with various vehicles in proximity to the bus wherein the letter "A" represents an exemplary scanning area of the apparatus in front of the bus where infractions by vehicles (whether driving towards the bus or away from the bus) are captured, the letter "B" represents an exemplary scanning area of the apparatus behind the bus where infractions by vehicles (whether driving towards the bus or away from the bus) are captured, and the letter "C" represents an exemplary scanning area of the apparatus to a side of the bus where optional video surveillance and analytics, and full scenery observation are performed and captured.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature | # | Feature |
| --- | --- | --- | --- |
| 10 | Retrofittable modular school bus safety apparatus | 20 | School bus |
| 22 | Speaker | 24 | Flashable lights |
| 26 | Crossing arm | 30 | CPU |
| 40 | Sensor | 42 | Camera1 |
| 44 | Electrical plug device | 46 | Video screen with microphone and speakers |

Referring now to the drawings, in a preferred embodiment the invention is a retrofittable modular school bus safety apparatus 10 comprising school bus 20, CPU 30, a plurality of sensors and scanners 40, at least one camera 42, electrical plug device 44 (not shown), and an optional output device preferably in the form of video screen with a microphone and speakers 46. School bus 20 preferably includes speaker 22, flashable lights 24, and crossing arm 26 having a "stop" sign mounted thereon. Electrical plug device 44 is preferably adapted to plug into a USB port or an OBD port to provide electrical power to CPU 30, sensors 40, camera 42, and other electricity requiring device and to provide actuatable communication to school bus devices such as speaker 22, flashable lights 24, crossing arm 26, etc. It is noted that apparatus 10 is specifically adapted to wirelessly detect actuation of crossing arm 26 having a "stop" sign mounted thereon. In an alternate embodiment, apparatus 10 does not include electrical plug device 44 but instead includes at least one battery and is adapted to connect wirelessly to school bus devices such as speaker 22, flashable lights 24, crossing arm 26, etc. if/as needed such as via a Bluetooth connection. Sensors 40 preferably include machine vision sensors, proximity detection sensors, and speed detection sensors. Apparatus 10 is adapted to "read" a vehicle's license plate via ALPR or Automatic License Plate Recognition which is also referred to as ANPR or Automatic Number-Plate Recognition, and to perform facial recognition. Apparatus 10 is preferably adapted to automatically monitor vehicles proximate school bus 20 in which CPU 30 is installed, especially proximate moving vehicles, that may be speeding in near proximity to school bus 20—especially while school bus 20 is stopped and passengers are entering and/or exiting school bus 20, and upon detecting a proximate speeding vehicle, to automatically respond with an appropriate level of response depending on a level of moving violation (e.g. if a proximate vehicle is speeding but only in the amount of 5 mph or less over the prevailing speed limit, apparatus 10 may respond with a mild audio or visual warning, but if a proximate vehicle is speeding in excess of 5 mph over the prevailing speed limit, apparatus 10 may respond with an aggressive audio or visual warning and/or with an automatic recording of the incident and the forwarding of such information to police so that police are enabled to send a moving violation ticket (a traffic ticket/fine) to the owner and/or operator of the speeding vehicle). Apparatus 10 is further adapted to automatically actuate warnings, including the actuation of crossing arm 26 in response to predetermined conditions such as the detection of school bus 20 stopping to load/unload and the detection of school bus 20 stopping in proximity to a railroad crossing. Apparatus 10 is further adapted to automatically wirelessly (via the internet) obtain the traffic laws/regulations applicable to location of school bus 20 and to operate accordingly. Apparatus 10 is further preferably adapted to simultaneously monitor up to seven lanes of traffic for both plate recognition, speed detection and enforcement. Apparatus 10 is further preferably adapted to provide a full 360 field of plate recognition, speed detection and speed enforcement.

Thus in practice a first operational scenario is as follows: With CPU 30, plurality of sensors and scanners 40, camera 42, electrical plug device 44, and output device 46 retrofittingly installed into school bus 20, apparatus 10 is ready and active. The driver of school bus 20 stops school bus 20 on the side of a road and proceeds to pick up passengers—school children (an ingress scenario). Upon detection of the initiation of the ingress scenario and for the duration thereof, apparatus 10 extends crossing arm 26 (preferably having a stop sign and lights activated to flash being mounted thereon) from school bus 20, causes flashable lights 24 to flash, causes speaker 22 to emit an audible alert, and monitors the proximate traffic. In response to a proximate a vehicle passing stopped school bus 20 and traveling at a speed of 3 mph over the posted limit for the ingress scenario area (i.e. speeding) an in closer than a predetermined limit to school bus 20, apparatus 10 automatically causes an increase in the intensity of the flashing of flashable lights 24, automatically causes an audible alert specific to the speeding vehicle to be sounded, automatically causes the speeding vehicle's license plate to be recognized via ALPR, automatically causes the speeding vehicle operator's face to be facially recognized, automatically causes the passing/speeding incident to be recorded, and automatically sends the recorded passing/speeding incident information to be forwarded to police to enable the police to issue a citation to the speeding vehicle owner and/or operator. Upon detection of the cessation of the ingress scenario, apparatus 10 automatically causes the retraction of the crossing arm 26, the cessation of flashing of flashable lights 24, the cessation the sounding of an audible alert, and the cessation of monitoring of the proximate traffic.

Thus, in practice a second operational scenario is as follows: With CPU 30, plurality of sensors and scanners 40, camera 42, electrical plug device 44, and output device 46 retrofittingly installed into school bus 20, apparatus 10 is ready and active. The driver of school bus 20 stops school bus 20 at a railroad crossing while all passengers remain inside school bus 20 (a railroad scenario). Upon detection of the initiation of the railroad scenario and for the duration thereof, apparatus 10 extends crossing arm 26 (preferably having a stop sign and lights activated to flash being mounted thereon) from school bus 20, causes flashable lights 24 to flash, causes speaker 22 to emit an audible alert, and monitors the proximate traffic. All proximate traffic is observed to obey the traffic laws/regulations applicable to location of school bus 20 and no incidents are recorded or forwarded to police. Upon detection of the cessation of the railroad scenario, apparatus 10 automatically causes the retraction of the crossing arm 26, the cessation of flashing of flashable lights 24, the cessation the sounding of an audible alert, and the cessation of monitoring of the proximate traffic.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular safety apparatus comprising
a CPU,
a plurality of sensors and at least one output device,
the apparatus is removably mountable on an exterior portion of a school bus,
wherein the CPU is configured to automatically activate at least one warning relevant to a circumstance,
upon detection of the circumstance, the modular safety apparatus extends a crossing arm on the school bus,
the apparatus is adapted to automatically wirelessly obtain traffic rules applicable to its location,
the apparatus automatically monitors traffic in proximity to the apparatus and automatically provides a response from the at least one output device other than the at least one warning if a vehicle proximate the apparatus violates at least one obtained rule,
the violation of the at least one obtained rule comprises at least one of a proximate vehicle traveling at a predetermined rate within a predetermined distance to the apparatus or a proximate vehicle passing the apparatus when the school bus is stationary and is indicating the at least one warning,
the apparatus automatically performs facial recognition of the speeding vehicles operator and automatically records the violation of the rule, and
the response comprises at least one of an audible warning, a visual warning, a recordation of proximate vehicle data, or a transmission violation of the proximate vehicle data to police to enable a citation of at least one of a proximate vehicle operator or a proximate vehicle owner, and a level of the response is determined to correspond to a level of the violation of the at least one rule;
wherein the apparatus divides an area proximate to the bus into three scanning areas, where a first scanning area (A) is a scanning area of the apparatus in front of the bus where the apparatus monitors for rule violations of vehicles driving towards the bus or away from the bus, and second scanning area (B) is a scanning area of the apparatus behind the bus where the apparatus monitors for rule violations of vehicles driving toward the bus or away from the bus, and third scanning area (C) is a scanning area to the side of the bus that is monitored by video surveillance.

2. The modular safety apparatus of claim 1, wherein the plurality of sensors comprises at least one of a vision sensor, a sound sensor, a proximity sensor, a speed sensor, an Xray sensor, and a combination thereof, and wherein the CPU further comprises a CPU having at least one of a GPS system, a digital storage system, a long-term evolution system, a Wi-Fi system, and a Bluetooth system.

3. The modular safety apparatus of claim 1, wherein the modular safety apparatus wirelessly detects actuation of the crossing arm.

4. The modular safety apparatus of claim 1, wherein the circumstance further comprises performing an automatic license plate recognition (ALPR).

5. A modular safety apparatus comprising
a weatherproof spatial envelope containing a CPU,
a plurality of sensors and at least one output device, the weatherproof spatial envelope is removably mountable on an exterior portion of a school bus,
wherein the plurality of sensors comprises at least one of a vision sensor, a sound sensor, a proximity sensor, a speed sensor, an Xray sensor, and a combination thereof, and
wherein the CPU is configured automatically activate at least one warning relevant to a circumstance, and upon detection of the circumstance, the weatherproof spatial envelope extends a crossing arm on the school bus,
wherein the CPU further comprises a CPU having at least one of a GPS system, a digital storage system, a long-term evolution system, a Wi-Fi system, or a Bluetooth system,
the apparatus is adapted to automatically wirelessly obtain traffic rules applicable to its location,
the apparatus automatically monitors traffic in proximity to the apparatus and automatically provides a response from the at least one output device other than the at least one warning if a vehicle proximate the apparatus violates at least one obtained rule,
the violation of the at least one obtained rule comprises at least one of a proximate vehicle traveling at a predetermined rate within a predetermined distance to the apparatus or a proximate vehicle passing the apparatus when the school bus is stationary and is indicating the at least one warning,
the apparatus automatically performs facial recognition of the speeding vehicles operator and automatically records the violation of the rule, and
the response comprises at least one of an audible warning, a visual warning, a recordation of proximate vehicle data, or a transmission violation of the proximate vehicle data to police to enable a citation of at least one of a proximate vehicle operator or a proximate vehicle owner, and a level of response is determined to correspond to a level of the violation of the at least one rule;
wherein the apparatus divides an area proximate to the bus into three scanning areas, where a first scanning area (A) is a scanning area of the apparatus in front of the bus where the apparatus monitors for rule violations of vehicles driving towards the bus or away from the bus, and second scanning area (B) is a scanning area of the apparatus behind the bus where the apparatus monitors for rule violations of vehicles driving toward the bus or away from the bus, and third scanning area (C) is a scanning area to the side of the bus that is monitored by video surveillance.

6. The modular safety apparatus of claim 5, wherein the circumstance further comprises performing an automatic license plate recognition (ALPR).

* * * * *